United States Patent [19]

Sugawara et al.

[11] Patent Number: 4,997,252

[45] Date of Patent: Mar. 5, 1991

[54] OPTICAL FIBER COMMUNICATION CONNECTION DEVICE

[75] Inventors: Mitsuru Sugawara; Akitoshi Yoshinaga; Masahiro Sakakibara, all of Kanagawa, Japan

[73] Assignee: Kabushiki Kaisha Toshiba, Kawasaki, Japan

[21] Appl. No.: 419,744

[22] Filed: Oct. 11, 1989

[30] Foreign Application Priority Data

Nov. 2, 1988 [JP] Japan .................................. 63-277819

[51] Int. Cl.$^5$ .............................. G02B 6/26; H04J 1/00
[52] U.S. Cl. .............................. 350/96.20; 350/96.18; 350/311; 350/318; 370/3
[58] Field of Search ............... 350/96.10, 96.15, 96.16, 350/96.17, 96.18, 96.20, 96.21, 311, 316, 318, 444; 370/1, 2, 3, 4; 250/227.11

[56] References Cited

U.S. PATENT DOCUMENTS

| | | | |
|---|---|---|---|
| 4,707,067 | 11/1987 | Haberland et al. | 350/96.20 |
| 4,767,171 | 8/1988 | Keil et al. | 350/96.18 |
| 4,779,947 | 10/1988 | Ito | 350/96.20 |
| 4,802,727 | 2/1989 | Stanley | 350/96.20 |
| 4,836,633 | 6/1989 | Morgan et al. | 350/96.18 |
| 4,867,520 | 9/1989 | Weidel | 350/96.16 |

FOREIGN PATENT DOCUMENTS

| | | | |
|---|---|---|---|
| 62-261183 | 11/1987 | Japan | 350/96.20 X |
| 63-228112 | 9/1988 | Japan | 350/96.20 X |

*Primary Examiner*—Brian Healy
*Attorney, Agent, or Firm*—Cushman, Darby & Cushman

[57] ABSTRACT

A device for receiving optical signals in which optical signals from an optical fiber are focused by a lens. A holder holds the fiber and the lens and is fixed to a case. The light receiving element is included in the case and can receive the optical signals from the lens through a hole in the case. A seal covers the hole and is able to pass the optical signals from the lens to the light receiving element.

29 Claims, 5 Drawing Sheets

OPTICAL FIBER COMMUNICATION CONNECTION DEVICE

BACKGROUND OF THE INVENTION

1. Field of the Invention

This invention relates to a device for receiving light signals. More specifically, the invention relates to light receiving modules for optical communications which have application in high speed optical transmission systems.

2. Description of Related Art

As signal transmission speeds increase, a light element for converting optical signals into electrical signals in an optical communication system, for example, must be able to receive optical signals of large bandwidth and operate with high precision. At high transmission speeds, such as several gigabits per second, it is important to reduce parasitic capacitances and parasitic inductances to the utmost in connections between electronic elements, such as semiconductor elements, resistors and capacitors, and the light receiving element. If this is accomplished, it is possible to prevent bandwidth deterioration due to the wiring of the elements. Also, typically, deterioration of the light receiving element arises due to adverse reactions with oxygen in the air, etc. Therefore, it is necessary to hermetically seal the light receiving element to protect it from the external atmosphere. FIGS. 8(a) and 8(b) show a conventional light receiving module. FIG. 8(a) is a plan view of the module and FIG. 8(b) is a cross-sectional view taken along line A—A in FIG. 8(a). The module includes a light receiving element 802, electronic elements 804, 806 and 808 and a fiber holder 81. Light receiving element 802 is an optical semiconductor element, such as photodiode, which performs the photoelectric conversion. Electronic elements 804, 806 and 808 constitute a receiving circuit, provided with electrical signals from light receiving element 802. Elements 802, 804, 806 and 808 are disposed on a printed circuit board 82 which is incorporated in a case 83. Electrical conductive traces (not shown) are formed on board 82 to interconnect elements 802, 804, 806 and 808. Terminals 84, permitting connection to an external circuit (not shown), are arranged on a base of case 83. A side of case 83 has a hole 85 for fiber holder 81 to introduce an optical signal to light receiving element 802.

Fiber holder 81 includes an optical fiber 811 and a tube 812. Optical fiber 811 comprises an optical fiber strand 811a and a jacket (covering layer) 811b which covers strand 811a. Tube 812 is inserted into hole 85 of case 83. Optical fiber 811 is fixed to tube 812 at an optimum position relative to light receiving element 802 by solder 813 and adhesive 814.

Light receiving element 802 is mounted on board 82 with electronic elements 804, 806 and 808 in a densely packed arrangement. By densely packing the elements in case 83, it is possible to reduce electrical parasitic capacitances and parasitic inductances. Also optical fiber 811 is fixed so that an end of fiber strand 811a can be as close as possible to light receiving element 802. Therefore, it is possible to prevent the optical coupling efficiency from deteriorating due to any expansion of the output light wave from optical fiber 811.

In this conventional light receiving module, case 83 is made airtight by a cover 86 to prevent characteristics of light receiving element 802 from deteriorating. However, it is difficult to make fiber holder 81 completely airtight because of poor solder connections between tube 812 and optical fiber 811. Voids remain in solder 813. This produces a yield decrease during production of optical holder 81. To improve the yield, flux may be used to decrease surface tension and remove an oxide film on the solder. However, flux vapor, released during heating, deteriorates the optical coupling due to contamination of light receiving element 802 and an end surface of fiber strand 811a. Also, since fiber strand 811a extends beyond tube 812 as shown in FIG. 8(a) and 8(b), the end of fiber strand 811a is easy to move and strand 811a easily sags as a result of external vibrations and impact.

Thus, the optical coupling efficiency varies. Also, the airtight seal is not always reliable, particularly when subjected to changes in temperature. Differences in the thermal expansion coefficient between the glass fiber and solder weaken the bonding. In addition, when solder is heated to fix optical fiber 811, jacket 811b is easy to damage. This decreases the production yield of the light receiving module.

Moreover, when fiber strand 811a is inserted in tube 82 and fiber strand 811a is brought close to light receiving element 802 to secure optical fiber 811, if fiber strand 811a hits light receiving element 802, the fiber may break and the light receiving element 802 may be damaged. The effective diameter of light receiving element 802 for high-speed communication is less than or equal to 100 82 m, it is necessary to bring fiber strand 811a within a distance less than or equal to several hundred μm from light receiving element 802. Thus, fiber strand 811a often bumps light receiving element 802 during alignment.

SUMMARY OF THE INVENTION

It is an object of the present invention to provide an optical communication device having a stable operation.

It is a further object of the present invention to provide an optical communication device having a construction which will easily be conducive to high production yields.

It is still a further object of the present invention to provide an optical communication device having a highly reliable airtight seal.

To achieve the above objects and in accordance with the purpose of the invention, as embodied and broadly described herein, the invention provides an optical communication device for receiving optical signals. An optical fiber is held by a holder. A light receiving element is included in a case with a hole. The holder is fixed to the case. The hold is sealed by a seal, through which the optical signals from the optical fiber pass to the light receiving element.

BRIEF DESCRIPTION OF THE DRAWINGS

The present invention is best understood with reference to accompanying drawings in which.

DETAILED DESCRIPTION OF THE PREFERRED EMBODIMENTS

Figure 1A:
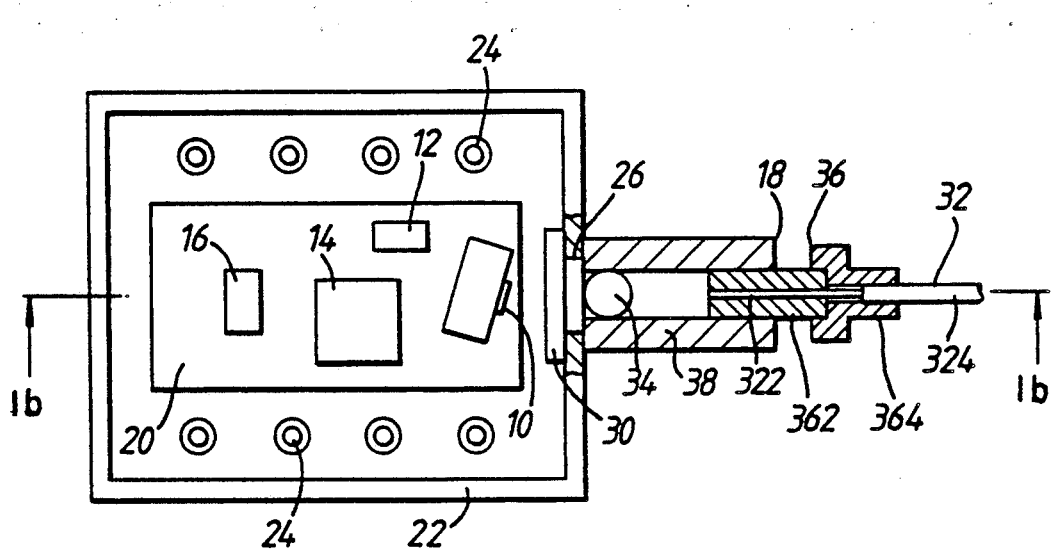
FIG. 1(a) is a plan view of a device according to a first embodiment of this invention.

Referring to the accompanying drawings, embodiments of the present invention will be described. In the drawings, the same numerals are applied to similar elements and therefore detailed descriptions thereof are not repeated.

Figure 1B:
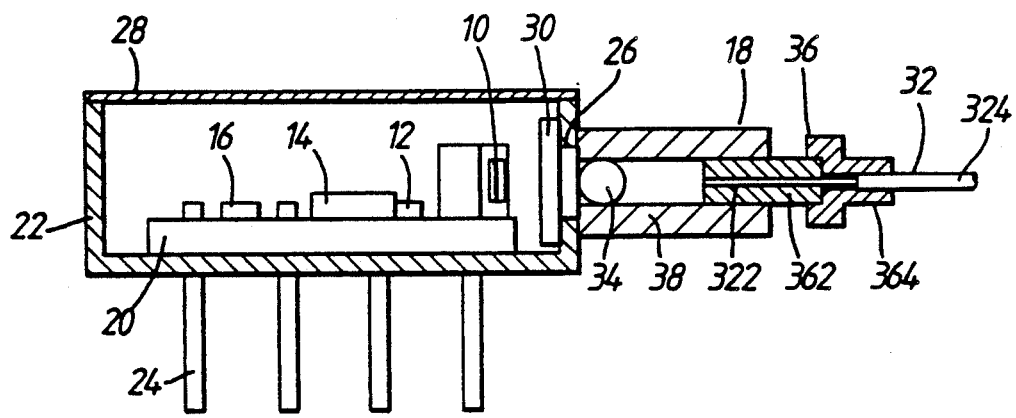
FIG. 1(b) is a cross-sectional view taken along A—A in FIG. 1(a)

A device shown in FIGS. 1 (a) and 1(b) includes a light receiving element 10, electronic elements 12, 14 and 16 and an optical fiber unit 18. Light receiving element 10 is, for example, an optical semiconductor element, such as a photodiode, which can perform photoelectric conversion. Electronic elements 12, 14, and 16 constitute a receiving circuit, provided with electrical signals from light receiving element 10. Elements 10, 12, 14 and 16 are disposed on a printed circuit board 20 which is incorporated in a case 22. Conductive traces (not shown) are formed on board 20 to interconnect elements 10, 12, 14 and 16. Terminals 24, which may be connected to an external circuit (not shown), are arranged on a base of case 22.

A side of case 22 has a hole 26 for introducing optical signals from the fiber unit 18 to light receiving element 10. Case 22 is made airtight by a cover 28 and a sealing window 30. Sealing window 30 covers hole 26 to seal case 22 and allow optical signals to pass therethrough. Optical fiber unit 18 comprises an optical fiber 32, a lens 34, a ferrule 36 and a sleeve 38. Optical fiber 32 includes an optical fiber strand 322 and a jacket (covering layer) 324 which covers strand 322. Ferrule 36 fixes strand 322 and jacket 324 as one body, and has a ceramic element 362, which holds strand 322, and a metal element 364 which holds jacket 324. Lens 34, which is a spherical lens, focuses optical signals from optical fiber 32. Sleeve 38 holds lens 34 and ceramic element 362 of ferrule 36 on the same optical axis. Optical fiber unit 18 is fixed to an outside surface of the side wall of case 82 after the position of optical fiber unit 18 is adjusted relative to light receiving element 10. Optical signals from optical fiber unit 18 (from optical fiber 32 through lens 34) couple to light receiving element 10 through the hole 26 and sealing window 30.

In this device, optically modulated signals, at a high signal rate from optical fiber unit 18, are focused by lens 34. Light receiving element 10 receives the focused optical signals through sealing window 30 and converts the optical signals to electrical signals. Electrical signals corresponding to the optical signals are supplied to electronic elements 12, 14 and 16 to be processed electrically, for example, amplified, peak detected, etc. Electrical signals may be supplied to an external circuit (not shown) through terminals 24. Light receiving element 10 and electronic elements 12, 14 and 16 are mounted on board 20 with a high packing density. Therefore, it is possible to maximize the reduction of electrical parasitic capacitance and parasitic inductance due to interconnections of the elements. This enables light receiving element 10 and electronic elements 12, 14 and 16 to operate over a broad bandwidth.

Sealing window 30 is fixed to case 22 by low melting point glass, etc., before board 20 is mounted in case 22. Cover 28 is welded to case 22. Thus, light receiving element 10 is disposed in a sufficiently airtight case and highly reliable.

Optical fiber unit 18 enables the optical axis to be adjusted outside of case 22 and results in improved performance. Also, since optical fiber strand 322 is fixed by ferrule 36, it is possible to prevent the optical coupling efficiency from changing due to external vibrations and impact. Moreover, it is possible to prevent optical fiber 32 from breaking during assembly.

Lens 34 and ferrule 36 are held as one body by sleeve 38. This construction is useful for stabilizing the optical coupling because the relative position of optical fiber 32 and lens 34 does not changes as the surrounding temperature changes. When the outer diameters of lens 34 and a ceramic element 362 of ferrule 36 are approximately equal to or slightly larger than an inner diameter of sleeve 38, the assembly of optical fiber unit 18 is simplified.

When lens 34 is not only used for focusing optical signals but also used for making case 22 airtight, lens 34 must be fixed to case 22 itself. In that case, light receiving element 10 must be accurately disposed relative to lens 34 in order to obtain defined return loss, because the position at which an image is formed changes and the incidence angle of the optical signals to the light receiving element 10 is kept constantly because lens 34 is fixed by sleeve 38 with optical fiber 32 as one body.

Light receiving element 10 is disposed with a defined angle between the light receiving surface of element 10 and the optical axis of optical fiber unit 18 as shown in FIG. 1(a). Therefore, it is easily possible to get a defined return loss in the present device.

The distances between light receiving element 10 and lens 34, and between lens 34 and an end surface of optical fiber strand 322 are selectively set in accordance with an effective diameter of element 10. Thus, a magnification of the optical system may be changed and it is possible to realize an optical coupling without deterioration even if the effective diameter of element 10 is small.

Figure 2:
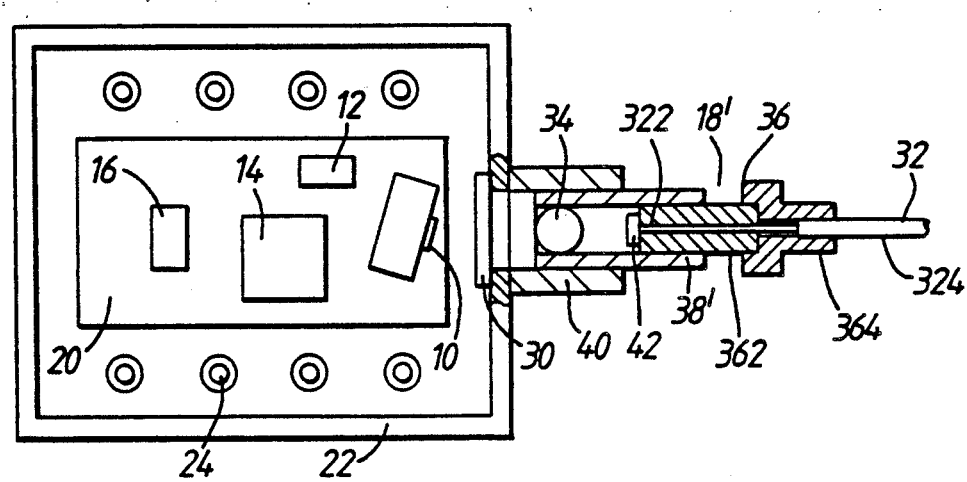
FIG. 2 is a plan view of a device according to a second embodiment of this invention.

FIG. 2 shows an optical communication device which allows the optical system to be adjusted easily. In this device, optical fiber unit 18 further includes a ring 40 and glass plate 42 having an antireflection film. Ring 40 is cylindrical and fixed to case 22. Cylindrical sleeve 38' is inserted into ring 40. The antireflection film is formed on a surface of glass plate 42 which is fixed to an end of optical fiber strand 322 (an end of ferrule 36).

Ring 40 is employed to adjust the optical axis of optical fiber unit 18' relative to light receiving element 10. Unit 18' may be adjusted vertically with respect to the optical axis of unit 18' by moving ring 40. Also optical fiber 32 may be adjusted parallel to the optical axis of unit 18' by moving ferrule 36 along sleeve 38'. Therefore, as a result of ring 40, adjusting the optical system vertically with respect to the optical axis is separated from adjusting the optical axis parallel to the optical axis. Thus, optical fiber unit 18' is adjusted and fixed to case 22 smoothly.

Due to the antireflection film on glass plate 42, it is possible to suppress retroreflected optical waves at the end of optical fiber strand 322 and to prevent deterioration of the optical coupling efficiency between optical fiber 32 and light receiving element 10. The antireflection film may be formed at the end of optical fiber strand 322 directly by vacuum evaporation, etc., to simplify construction. The antireflection film may be formed at a surface of lens 34 and sealing window 30 to suppress retroreflected optical waves and prevent the deterioration of the optical coupling efficiency even more.

Figure 3:
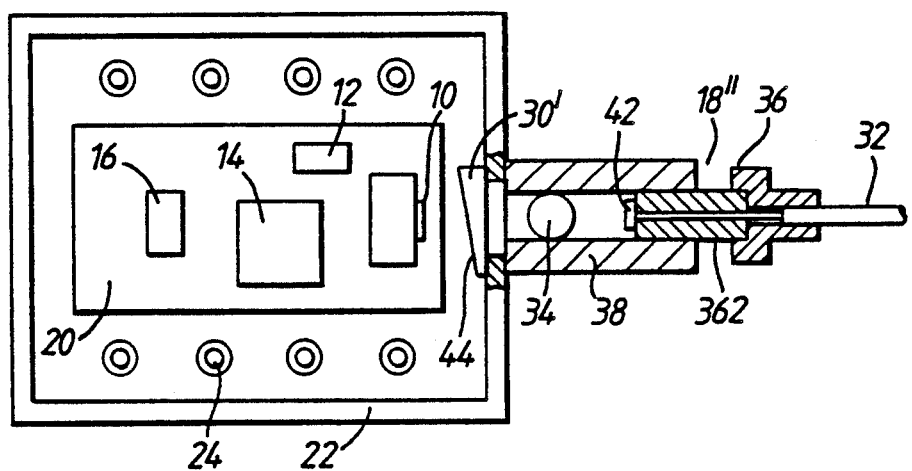
FIG. 3 is a plan view of a device according to a third embodiment of this invention.

When sealing window 30' has a wedge-shaped cross section as shown in FIG. 3, light receiving element 10 is disposed so that the light receiving surface of element 10 is perpendicular to the optical axis of optical fiber unit 18". In this case, when optical output signals from optical fiber unit 18" pass through sealing window 30', the signals change direction at a surface 44 of sealing window 30'. Therefore, it is possible to reduce reflections back into optical fiber unit 18" because the signals come to light receiving element 10 at a defined angle corresponding to the wedge-shaped cross section of sealing window 30'. The antireflection film formed on glass plate 42 may be replaced with an optical filter film which is capable of demultiplexing the optical signals.

Figure 4:
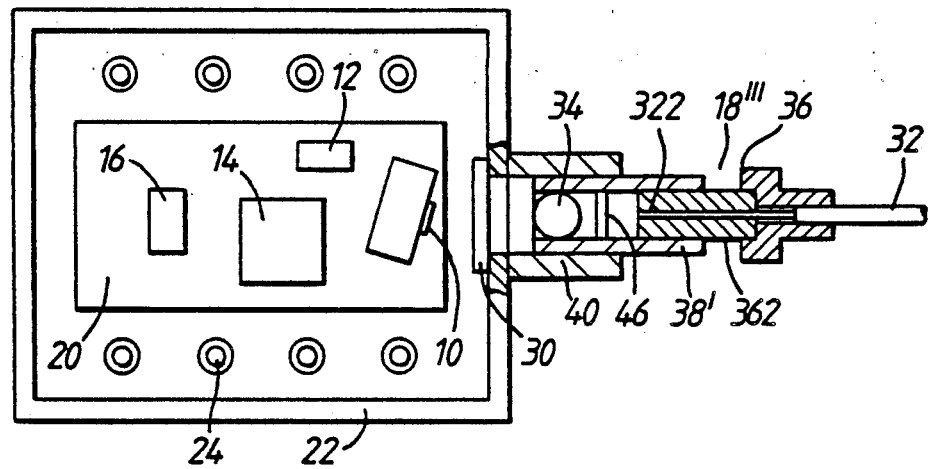
FIG. 4 is a plan view of a device according to a fourth embodiment of this invention.
Figure 5:
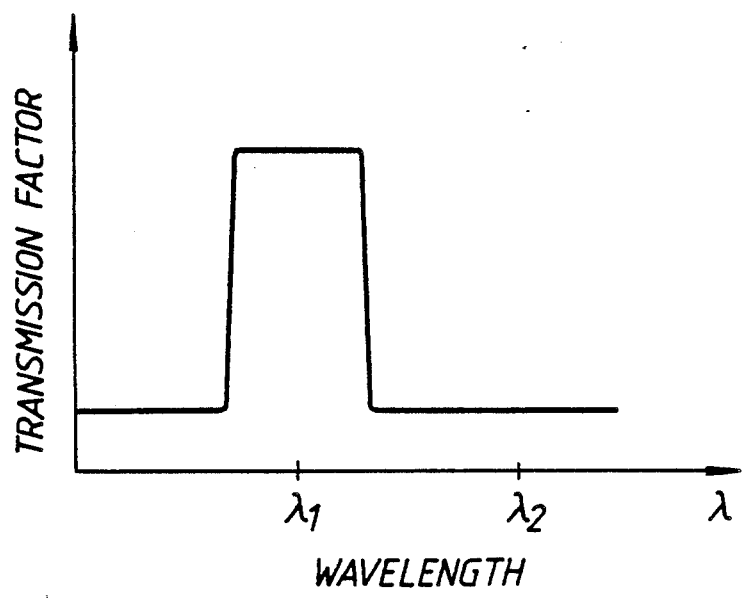
FIG. 5 is a graph showing the characteristics of a filter in FIG. 4.
Figure 6:
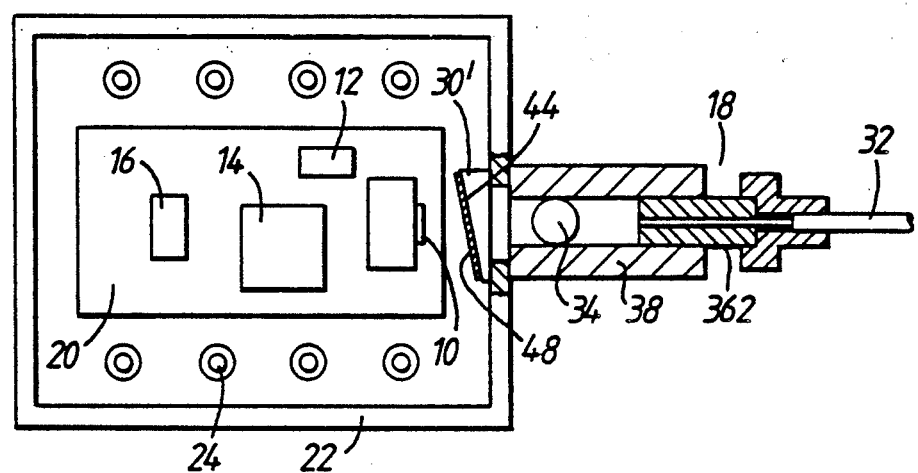
FIG. 6 is a plan view of a device according to a fifth embodiment of this invention.

As shown in FIG. 4, optical filter 46 is disposed in the optical path between optical fiber 32 and light receiving element 10, for example, between optical fiber strand 322 and lens 34. Optical filter 46 includes a dielectric multilayer. The relationship of transmission factor to wave length is shown in FIG. 5. The device having such a optical filter is useful for wavelength multiplexing in a communication system. In FIG. 6, optical filter film 48 is formed on surface 44 of sealing window 30'. With this arrangement, it is possible to prevent the optical signals having wavelengths different from that for communications from reflecting back into optical fiber 32, because such optical signals of different wavelength are reflected by film 48 at an angle to the optical axis of optical fiber 32.

Figure 7:
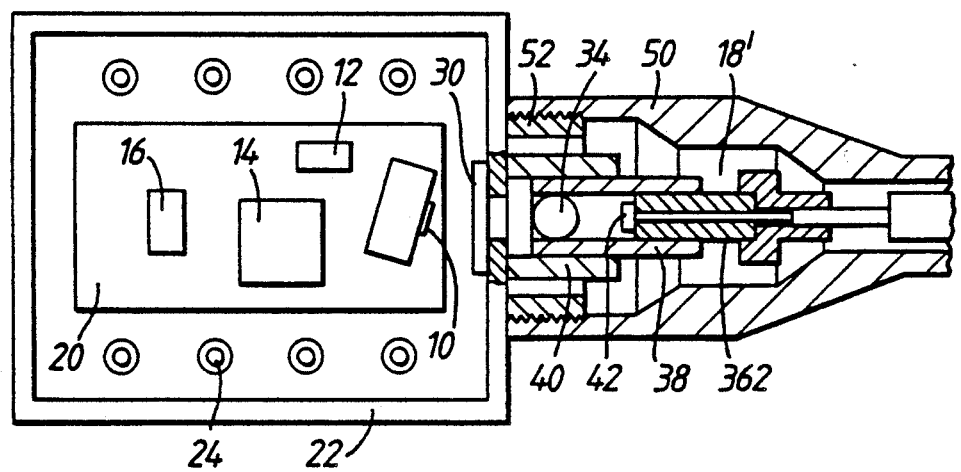
FIG. 7 is a plan view of a device according to a sixth embodiment of this invention.
Figure 8A:
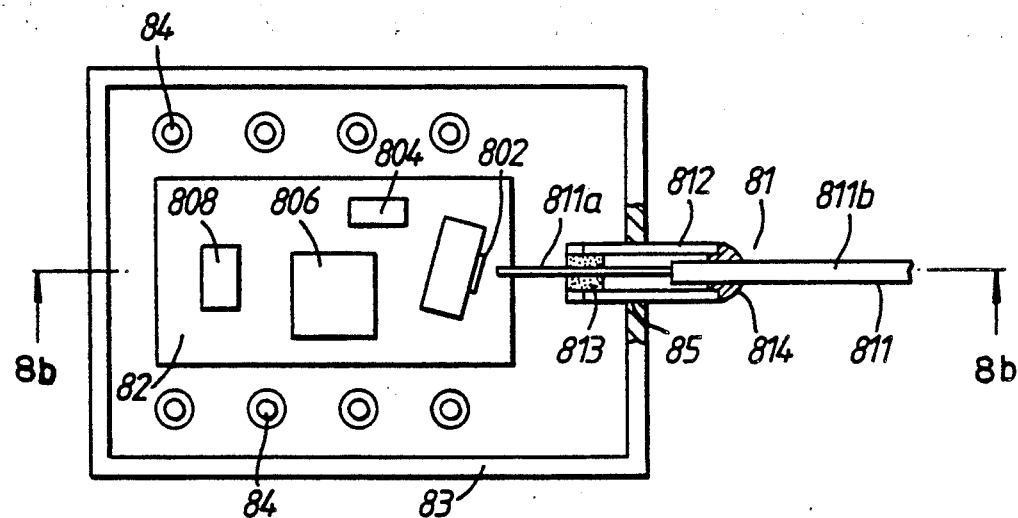
FIG. 8(a) is a plan view of a conventional light receiving module.
Figure 8B:
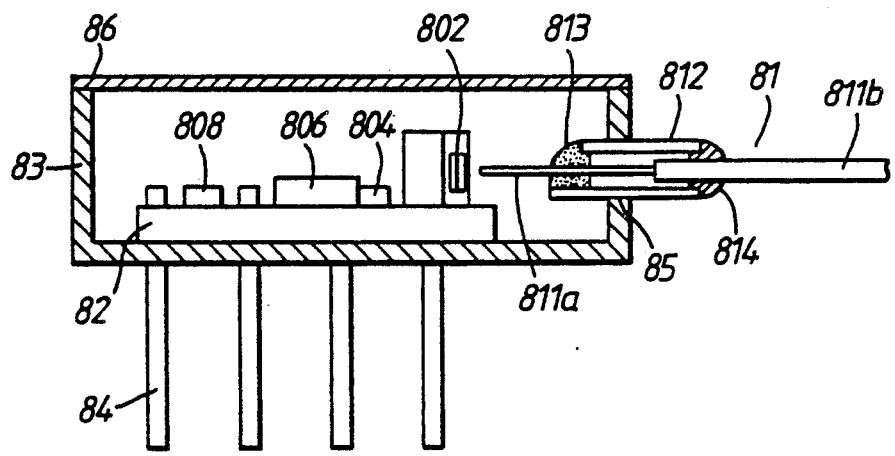
FIG. 8(b) is a cross-sectional view taken along line A—A in FIG. 8(a).

FIG. 7 shows a device having a cover 50 for protecting optical fiber unit 18'. A connecting ring 52 is fixed to the side of case 22. The inner diameter of ring 52 is greater than the outer diameter of ring 40 to allow vertical adjustment of unit 18'. Cover 50 is connected to ring 52.

In the embodiments mentioned above, sealing window 30 or 30' may be fixed to the outside of case 22 instead of the inside of case 22.

According to the present invention, it is possible to make the case enclosing a light receiving element airtight with a high reliability. Moreover, it is possible to construct the device easily with high production yields. Also the operation of the device is stabilized relative to changes in the external surroundings. Therefore, it is possible with the present invention to provide an improved optical communication device that is suitable for high speed optical transmission system.

What is claimed is:
1. A device for receiving optical signals, comprising:
   a case having walls within which an inside is defined, and having a hole in one of said walls thereof extending from an outside of said one wall to an inside of said walls;
   optical fiber means for delivering optical signals;
   holding means, connected to said outside of said one wall of said case and not extending inside said case, for holding the fiber means entirely outside of said case at a fixed position relative to the case;
   light receiving means, disposed in said inside of said case, for receiving the optical signals from the optical fiber means through the hole in the case; and
   sealing means, covering the hole, for sealing the case and for passing the optical signals from the fiber means outside said case through the hole in the case to the light receiving means inside said case.

2. The device of claim 1, wherein the light receiving means includes means for converting the optical signals to electrical signals.

3. The device of claim 2, further comprising electronic means, disposed in the case, for receiving the electrical signals.

4. The device of claim 3, further comprising board means, disposed in the case, for holding the light receiving means and the electronic means.

5. The device of claim 1, wherein the sealing means includes means for making the case airtight.

6. The device of claim 1, further comprising lens means, held by the holding means, for focusing the optical signals from the fiber means onto the light receiving means.

7. The device of claim 6, wherein the holding means includes means for holding the fiber means and the lens means as one body.

8. The device of claim 6, wherein the holding means includes means for holding the fiber means and the lens means on the same optical axis.

9. The device of claim 6, wherein the optical fiber means includes an optical fiber strand and a jacket which covers the strand.

10. The device of claim 9, wherein the holding means includes strand holding means for holding the optical fiber strand.

11. The device of claim 10, wherein the holding means includes fixing means for holding the lens means and the strand holding means.

12. The device of claim 11, wherein the lens means and the strand holding means have substantially the same outer diameter.

13. The device of claim 12, wherein the fixing means has an inner diameter which is substantially equal to the outer diameter of the lens means and the strand holding means.

14. The device of claim 1, wherein the holding means includes means for keeping the incidence angle of the optical signals to the light receiving means constant.

15. The device of claim 1, wherein the light receiving means includes a light receiving surface for receiving the optical signals.

16. The device of claim 15, further comprising means, disposed in the case, for holding the light receiving surface of the light receiving means at a specific angle relative to an optical axis of the holding means.

17. The device of claim 11, wherein the holding means includes adjusting means for holding the fixing means and for adjusting the vertical position of the fixing means relative to an optical axis of the light receiving means.

18. The device of claim 1, further comprising antireflection means, disposed in a path of the optical signals, for preventing the optical signals from reflecting at a defined position.

19. The device of claim 18, wherein the antireflection means includes an antireflection film formed on an end of the optical fiber means.

20. The device of claim 18, further comprising lens means, held by the holding means, for focusing the optical signals from the fiber means onto the light receiving means, wherein the antireflection means includes an antireflection film formed on a surface of the lens means.

21. A device for receiving optical signals, comprising:
a case having a hole;
optical fiber means for delivering optical signals;
holding means, connected to the case, for holding the fiber means at a fixed position relative to the case;
light receiving means, disposed in the case, for receiving the optical signals from the fiber means through the hole in the case;
sealing means, covering the hole, for sealing the case and for passing the optical signals from the fiber means through the case to the light receiving means; and
antireflection means, disposed in a path of the optical signals, for preventing the optical signals from reflecting at a defined position, wherein the antireflection means includes an antireflection film formed on the sealing means.

22. A device for receiving optical signals, comprising:
a case having a hole;
optical fiber means for delivering optical signals;
holding means, connected to the case, for holding the fiber means at a fixed position relative to the case;
light receiving means, disposed in the case, for receiving the optical signals from the fiber means through the hole in the case; and
sealing means, covering the hole, for sealing the case and for passing the optical signals from the fiber means through the case to the light receiving means, wherein the sealing means includes a window having a wedge-shaped cross section.

23. The device of claim 1, further comprising optical filter means, disposed in a path of the optical signals, for demultiplexing the optical signals.

24. The device of claim 23, wherein the optical filter means includes an optical filter film formed in an optical path between the optical fiber means and the light receiving means.

25. A device for receiving optical signals, comprising:
a case having a hole;
optical fiber means for delivering optical signals;
holding means, connected to the case, for holding the fiber means at a fixed position relative to the case;
light receiving means, disposed in the case, for receiving the optical signals from the fiber means through the hole in the case;
sealing means, covering the hole, for sealing the case and for passing the optical signals from the fiber means through the case to the light receiving means, and
optical filter means, disposed in a path of the optical signals, for demultiplexing the optical signals, wherein the optical filter means includes an optical filter film formed on at least one of the sealing means and the optical fiber means.

26. A device for receiving optical signals, comprising:
a case having a hole;
optical fiber means for delivering optical signals;
holding means, connected to the case, for holding the fiber means at a fixed position relative to the case;
light receiving means, disposed in the case, for receiving the optical signals from the fiber means through the hole in the case; and
sealing means, covering the hole, for sealing the case and for passing the optical signals from the fiber means through the case to the light receiving means, further comprising optical filter means, disposed in a path of the optical signals, for demultiplexing the optical signals, further comprising lens means, held by the holding means, for focusing the optical signals from the fiber means onto the light receiving means, and wherein the optical filter means includes an optical filter film formed on the lens means.

27. The device of claim 1, further comprising means for protecting the holding means.

28. A device for receiving optical signals through a fiber comprising:
a rectangular casing, having a plurality of walls within which an inside is defined and outside of which an outside is defined, and having a hole in one of said walls which extends from said outside of said casing to said inside of said casing;
sealing means for transparently covering and sealing said hole, and including sealing surfaces which abut against a sealing surface of said one wall on which said hole is formed, said sealing surfaces of said sealing means which abut against said sealing surfaces of said wall being substantially flat;
holding means, connected to said outside of said one wall, for receiving a fiber and holding said fiber entirely outside said one wall; and
means, within said casing, for receiving light from said fiber through said hole and through said sealing means.

29. A device as in claim 28, wherein said sealing means is a sealing window which has a wedge shaped cross section.

* * * * *